M. L. JENKINS.
FRICTION DRIVING MECHANISM.
APPLICATION FILED AUG. 13, 1910.
1,048,315.
Patented Dec. 24, 1912.
2 SHEETS—SHEET 2.
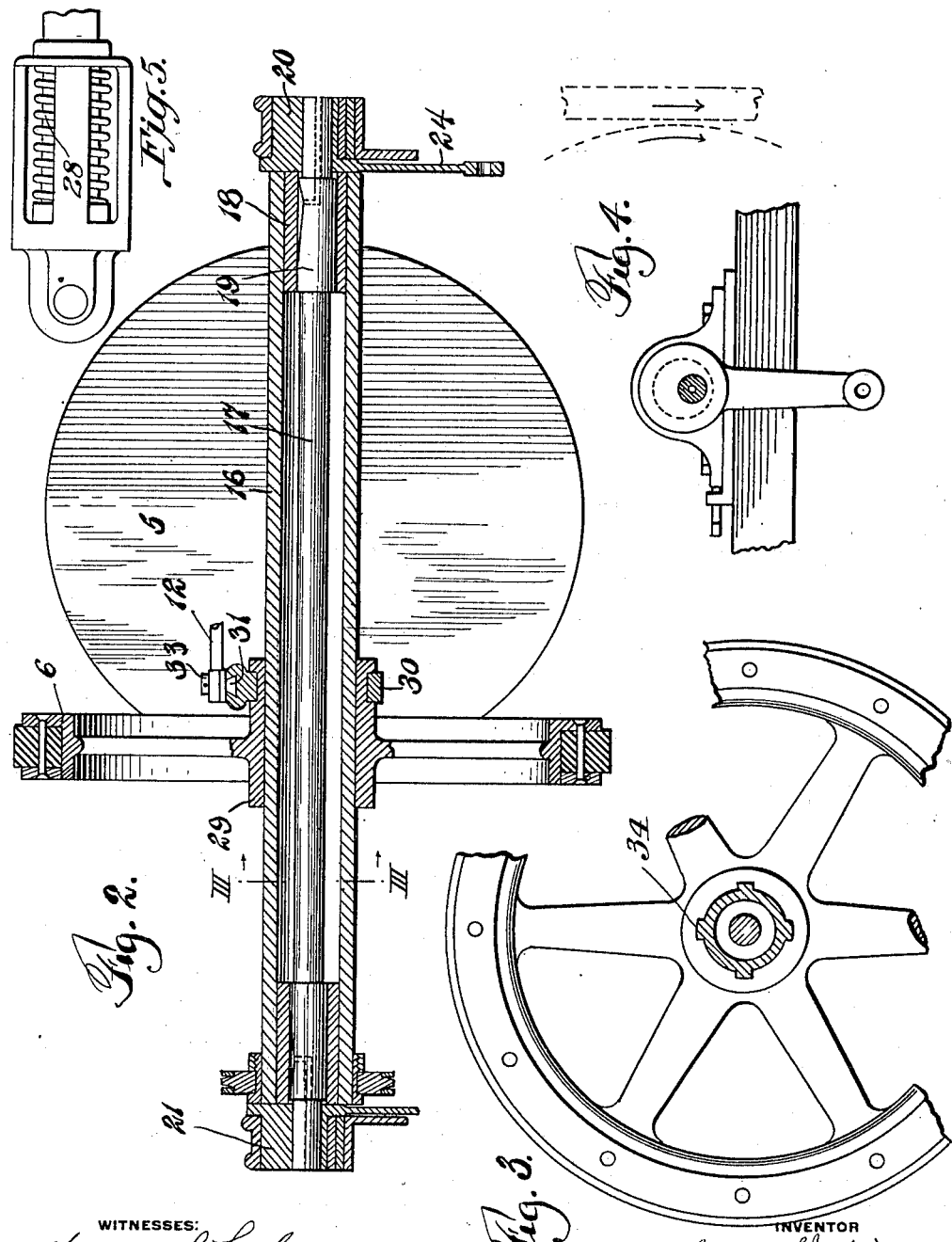
WITNESSES:
Harvey L. Lechner
Archworth Martin
INVENTOR
Merrell L. Jenkins
by atty
Paul Synnestvedt

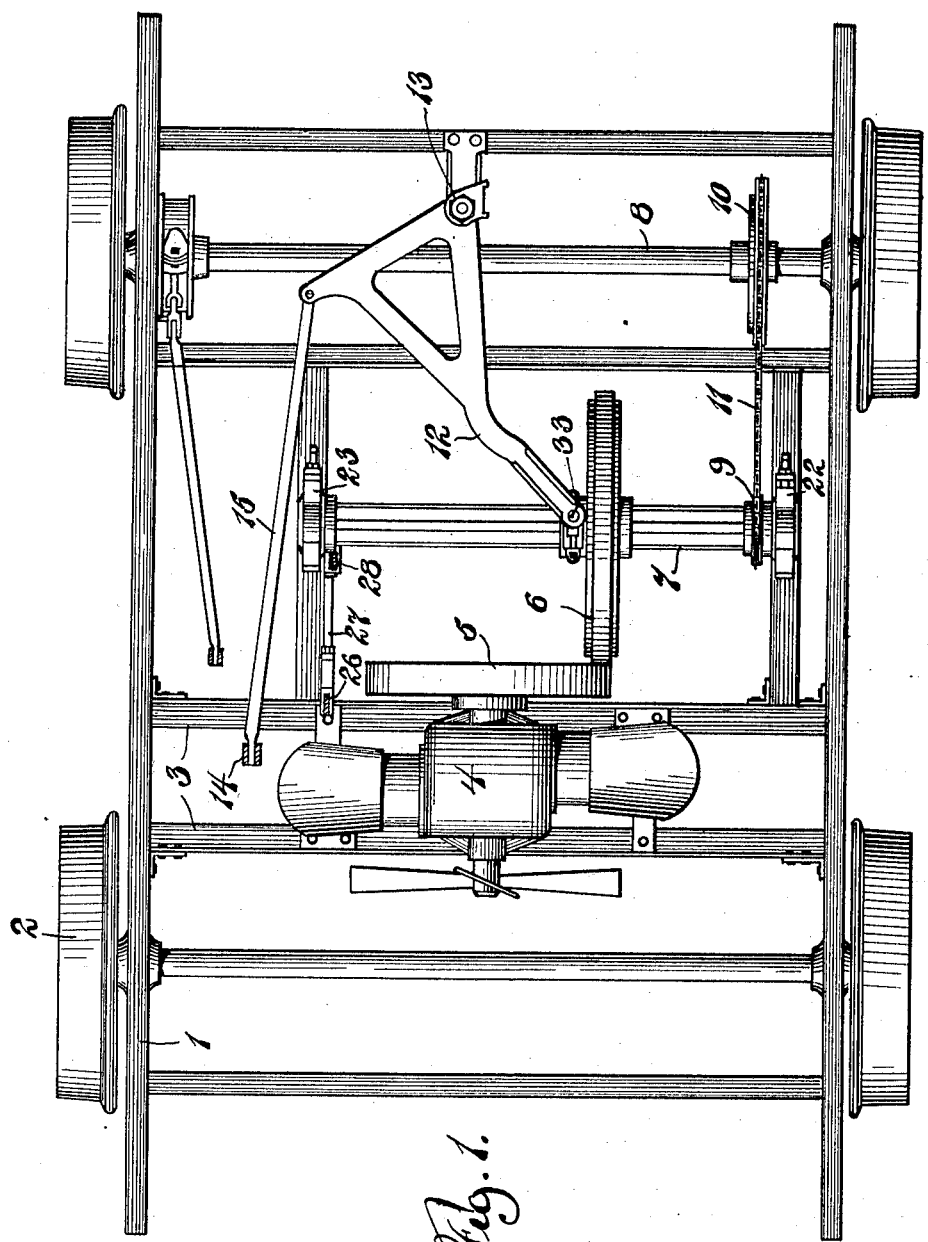

UNITED STATES PATENT OFFICE.

MERRILL L. JENKINS, OF HARVEY, ILLINOIS, ASSIGNOR TO THE BUDA COMPANY, OF CHICAGO, ILLINOIS, A CORPORATION OF ILLINOIS.

FRICTION DRIVING MECHANISM.

1,048,315. Specification of Letters Patent. Patented Dec. 24, 1912.

Original application filed February 20, 1909, Serial No. 479,025. Divided and this application filed August 13, 1910. Serial No. 577,058.

*To all whom it may concern:*

Be it known that I, MERRILL L. JENKINS, a citizen of the United States, residing at Harvey, in the county of Cook and State of Illinois, have invented certain new and useful Improvements in Friction Driving Mechanism, of which the following is a specification.

My invention relates to friction driving mechanism for use in motor vehicles, such for example as railroad track cars and the like, and it is a division of my application #479,025, filed February 20, 1909, and entitled railroad track cars.

It has for its primary object; the provision of an improved friction driving mechanism wherein wear is reduced to a minimum, and shocks incident to service are absorbed. These and such other objects as may hereinafter appear, or are incidental to my invention, I attain by means of a construction illustrated in preferred form in the accompanying drawings, wherein—

Figure 1 is a plan view of the chassis of the track car provided with my improved mechanism. Fig. 2 is a longitudinal section through the main driving shaft. Fig. 3 is a section on the line III—III of Fig. 2, and Fig. 4 is an end view of the shifting means for the main driving shaft, and Fig. 5 is a detailed view of a spring used in connection with the operating lever mechanism.

Referring to Fig. 1 of the drawing, it will be seen that I have shown my improved driving mechanism applied to a railroad track car, which comprises the frame 1, in which are mounted the wheels 2, and the braces or cross pieces 3 which carry the motor 4 and the drive mechanism. The driving mechanism comprises the fly wheel of the motor which serves the purpose of a friction driving disk adapted to be engaged by a friction wheel 6 shiftably mounted on the main driving shaft 7. The rear axle 8 is driven from the shaft 7 by means of the sprockets 9 and 10 and the chain 11 in the usual manner. The friction or driven wheel 6 is shifted on the driving shaft 7 by means of the bell crank lever 12, pivoted at 13 to the frame of the car and connected to the operating lever 14 by the connecting rod 15. By this arrangement the friction wheel 6 can be shifted from or toward the center of the driving or friction disk 5 thereby increasing or diminishing the rate of speed of the car.

Referring now more particularly to Fig. 2, it will be seen that the drive shaft comprises the hollow casing 16 through which extends the shaft 17. In the interior of the casing and adjacent its ends are bushings 18 journaled on the enlarged portion 19 on the shaft 17, said bushings serving as bearings between the casing and shaft 17. Eccentric blocks 20 and 21 are keyed to the ends of the shaft 17 and are mounted in bearings 22 and 23 secured to the framework. The eccentric 20 is provided with an arm 24 connected to an operating lever 26 by the rod 27 which has a yielding spring connection 28 adapted to take up shocks incident to service. By means of the mechanism just described the main driving shaft 7 may be moved away from the disk 5 thereby disengaging the friction or driven wheel 6 from said disk. During such operation the movement of the shaft is on an arc and, as but slight movement is necessary to disengage the friction wheels, it is obvious that there is but slight longitudinal movement given the sprocket wheel 9 so that any tightening or loosening of the chain is negligible.

The means whereby the end of the lever 12 is engaged with the wheel 6 indicated in Fig. 2, from which it will be seen that the wheel 6 is provided with a grooved hub portion 29 carrying the collar 30. This collar 30 is provided on its upper side with a transverse dovetail engaging portion 31 carrying the block 33, with which the end of the lever 12 is pivotally engaged. This provides the necessary lost motion between the lever 12 and the collar 30 as the lever moves along the shaft in shifting the wheel 6. The casing 16 has longitudinally extending ribs 34 as indicated in Fig. 3 and the hub portion of the wheel 6 is grooved to fit the casing, thus providing non-rotative engagement.

The camming action secured by the eccentrics besides giving positive and accurate engagement of the driving and driven wheels, has a further advantage. When the friction wheel 6 is out of engagement with the disk 5 the shaft 17 is in the position of Fig. 4, so that this shaft must be moved upwardly as well as laterally in order to secure the engagement between the disk and wheel. From this it follows that when periphery of the wheel is driven downwardly from the disk as indicated diagrammatically by the dotted lines and arrows, the reaction of the wheel and disk normally tends to force the shaft 17 to the position indicated in Fig. 4 and cause a disengagement of the disk and wheel. There is thus no tendency of the wheel and disk to work into closer engagement and dig or wear into one another. The arrangement has not only been found to increase the life of the disk and wheel, but also to greatly increase the efficiency of the driving mechanism.

A further advantage of my construction is that the sliding dovetail connection between the bell crank lever and the friction wheel not only provides the lost motion between the lever and the wheel necessary in shifting the latter, but also permits the free movement of the shaft toward or from the friction disk to engage or disengage the friction disk and wheel. It will be obvious that the construction is simple and effective.

Other advantages of my construction will present themselves to those skilled in the art.

Having thus described my invention and illustrated its use, what I claim as new and desire to secure by Letters Patent is the following:—

1. In combination in a vehicle of the character specified a driving wheel, a frame, a motor, a coöperating friction disk and wheel for driving the driving wheel, a drive shaft upon which the wheel is shiftably mounted, and means for shifting the wheel comprising a collar swiveled on the wheel, a block mounted for lateral movement on the collar, and a lever pivotally mounted and having pivotal connection with the block.

2. Friction transmission mechanism comprising in combination coöperating driving and driven members, a shaft upon which the driven member is shiftably mounted for movement; means for moving the driven member relatively to the driving member comprising a collar on the driven member, a lever pivoted to the collar, and a sliding connection between the lever and the said collar.

3. In a motor vehicle, or the like, the combination of a frame, and a motor mounted thereon; friction gearing comprising coöperating driving and driven members; a shaft mounted for movement in eccentric bearings on the frame and shiftably carrying the driven member; means for moving the driven member relatively to the driving member comprising a collar mounted on the hub of the driven member, a lever pivoted to the hub, and a sliding connection between the lever and the collar.

4. In a motor vehicle, or the like, the combination of a frame, and a motor mounted thereon; a friction disk; a shaft eccentrically mounted in the frame and extending transversely opposite the face of the disk; a friction wheel mounted for movement on the shaft and adapted to engage the friction disk with its periphery; an actuating lever; and a connecting rod provided with resilient means interposed between the lever and the shaft whereby the shaft may be shifted to carry the friction wheel into yielding engagement with the friction disk, substantially as described.

5. In a motor vehicle, the combination of a frame; a motor mounted thereon; a friction disk; a shaft eccentrically mounted in the frame and carrying an arm 24; a friction wheel mounted for movement on the shaft; an actuating lever; a connection between the lever and the arm 24 and carrying a spring mounted thereon, said spring being interposed between the lever and the arm, so that on actuation of the lever in one direction a positive disengagement is effected with respect to the disks, and actuation of the lever in another direction affords a yielding engagement of the disks in the manner set forth.

6. In a motor vehicle; the combination of a frame, coöperating driving and driven members; a shaft upon which the driven member is slidably mounted; an eccentric block secured to the shaft having bearings in the frame and carrying a projection thereon, an actuating lever, spring held connections between the lever and the projection, so that on actuation of the lever the projection has movement on an arc effecting a positive disengagement and a yielding engagement between the disks substantially as described.

7. In a motor vehicle or the like, the combination of a frame and a motor mounted thereon; a friction disk; a shaft eccentrically mounted in the frame and carrying a projection; a friction wheel mounted for movement on the shaft and adapted to engage the friction disk; an actuating lever; and a spring-held connection interposed between the lever and the projection, whereby the shaft may be shifted to carry the friction wheel yieldingly into engagement with the friction disk substantially as set forth.

In testimony whereof I have hereunto signed my name in the presence of the two subscribed witnesses.

MERRILL L. JENKINS.

Witnesses:
W. S. McDonald,
L. C. Curl.

---

Copies of this patent may be obtained for five cents each, by addressing the "Commissioner of Patents, Washington, D. C."